United States Patent
Mahe et al.

(10) Patent No.: US 9,239,697 B2
(45) Date of Patent: Jan. 19, 2016

(54) DISPLAY MULTIPLIER PROVIDING INDEPENDENT PIXEL RESOLUTIONS

(71) Applicant: NVIDIA Corporation, Santa Clara, CA (US)

(72) Inventors: Jacques Francois Mahe, Los Altos Hills, CA (US); Daniel Stewart Perrin, Fort Collins, CO (US); Raghvendra Purushottam Kamathankar, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 122 days.

(21) Appl. No.: 14/030,962

(22) Filed: Sep. 18, 2013

(65) Prior Publication Data

US 2014/0240330 A1     Aug. 28, 2014

Related U.S. Application Data

(60) Provisional application No. 61/768,341, filed on Feb. 22, 2013.

(51) Int. Cl.
*G09G 5/36* (2006.01)
*G06F 3/14* (2006.01)
*G09G 5/391* (2006.01)

(52) U.S. Cl.
CPC .............. *G06F 3/1431* (2013.01); *G09G 5/391* (2013.01); *G09G 2352/00* (2013.01); *G09G 2380/10* (2013.01)

(58) Field of Classification Search
CPC .......... G09G 5/391; G09G 2340/0407; G09G 2340/0414; G09G 2360/04
See application file for complete search history.

(56) References Cited

U.S. PATENT DOCUMENTS

| | | | | |
|---|---|---|---|---|
| 6,118,413 A | * | 9/2000 | Bril et al. ...................... | 345/596 |
| 2003/0234801 A1 | * | 12/2003 | Eglit et al. ..................... | 345/698 |
| 2006/0077201 A1 | * | 4/2006 | Shen ............................. | 345/213 |

* cited by examiner

*Primary Examiner* — Hau Nguyen
(74) *Attorney, Agent, or Firm* — Zilka-Kotab, PC

(57) ABSTRACT

A system, method, and computer program product are provided for a display multiplier. First image data is received for a first display device and second image data is received for a second display device, where the second display device has fewer scan lines than the first display device. A scan line of the second image data is duplicated and a display multiplier output stream is generated that includes a first scan line of the first image data, the scan line of the second image data, a second scan line of the first image data, and the duplicated scan line of the second image data.

16 Claims, 12 Drawing Sheets

DISPLAY MULTIPLIER PROVIDING INDEPENDENT PIXEL RESOLUTIONS

CLAIM OF PRIORITY

This application claims the benefit of U.S. Provisional Application No. 61/768,341, filed Feb. 22, 2013, the entire contents of which is incorporated herein by reference.

FIELD OF THE INVENTION

The present invention relates to graphics display devices, and more particularly to a display multiplier.

BACKGROUND

Conventional graphics processors are limited to two display outputs that are sufficient for today's phone and tablet applications. However, for some applications, such as providing displays within an automotive environment more than two display outputs may be needed. For example, as many as five different displays may exist in an automotive environment including a center dashboard display, a heads-up display (projected onto a windshield), and two rear seat entertainment displays. Each additional display output that is provided by a graphics processor increases the pin count of the graphics processor. Increasing the pin count typically increases the cost of the graphics processor. While supporting more than two displays is needed for some applications, increasing the pin count may not be possible for low-cost systems.

Thus, there is a need for addressing this issue and/or other issues associated with the prior art.

SUMMARY

A system, method, and computer program product are provided that implement a display multiplier. First image data is received for a first display device and second image data is received for a second display device, where the second display device has fewer scan lines than the first display device. A scan line of the second image data is duplicated and a display multiplier output stream is generated that includes a first scan line of the first image data, the scan line of the second image data, a second scan line of the first image data, and the duplicated scan line of the second image data.

DETAILED DESCRIPTION

A graphics processor may be configured to generate a display multiplier output stream that includes image data for two or more separate display devices for output via a single display connection. A display splitter unit processes the display multiplier output stream to generate a separate stream of image data and video display signals for each of the two or more separate display devices. The display splitter unit includes a pixel buffer for each display device and the pixel buffers are drained at a pixel output clock rate corresponding to each respective display device.

The pixel output clock rate may be different for each of the separate display devices. Rather than storing several scan lines or an entire frame of image data in each one of the pixel buffers, the rate at which original scan lines of image data are inserted into the display multiplier output stream is reduced by inserting duplicated scan lines. The rate at which the original scan lines for a particular display device are output to the display device is therefore reduced by removing the duplicated scan lines to display only the original scan lines. The rate at which the original scan lines appear in the display multiplier output stream is reduced as needed to substantially match the pixel output clock rate for the display device. Therefore, the size of the pixel buffer may be reduced to one or two scan lines.

Figure 1A:
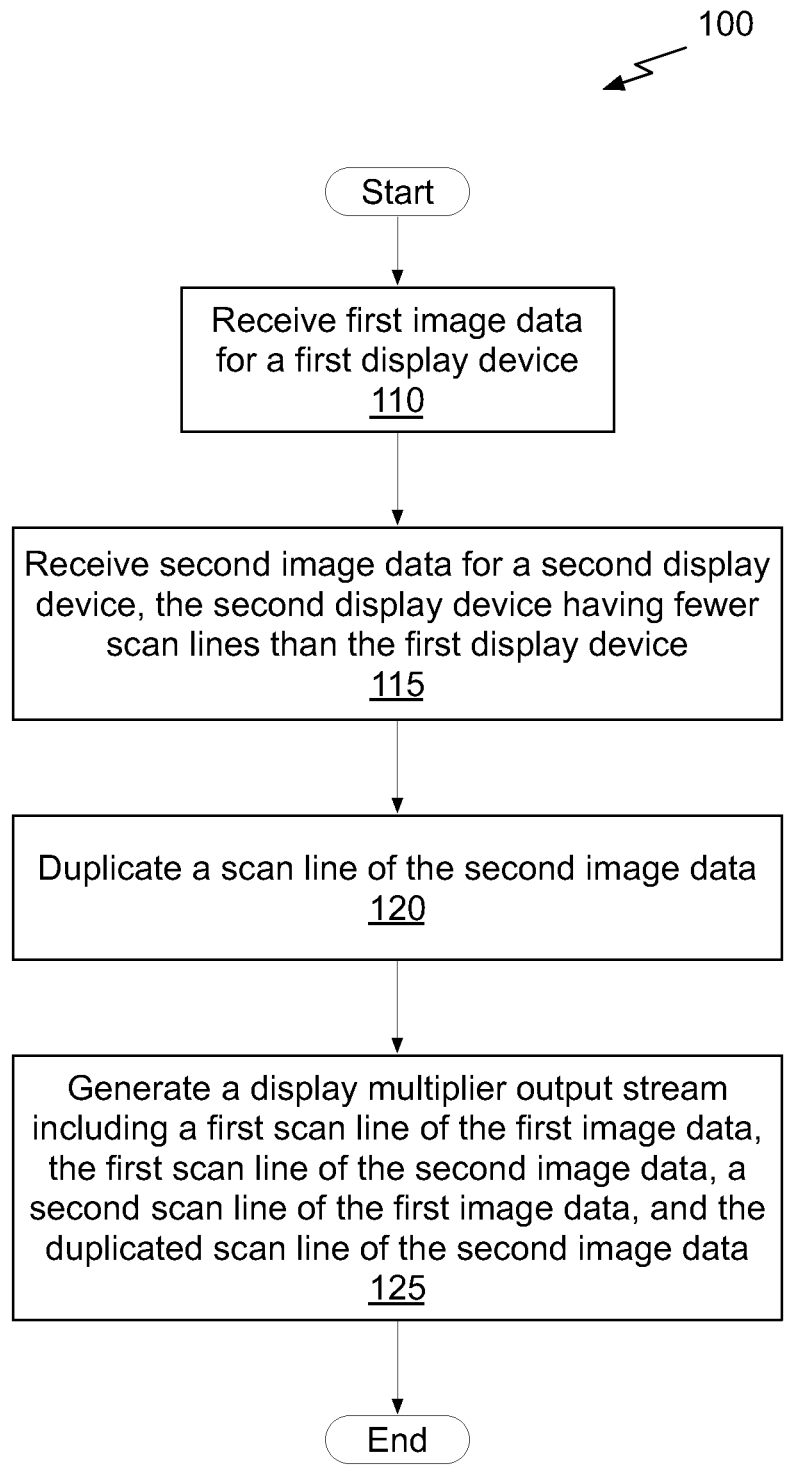
FIG. 1A illustrates a flowchart of a method for generating a display multiplier output stream, in accordance with one embodiment.

FIG. 1A illustrates a flowchart of a method 100 for generating a display multiplier output stream, in accordance with one embodiment. At operation 110, first image data for a first display device is received. In the context of the following description, image data represents a color associated with a pixel. In one embodiment, a color is encoded as red, green, and blue channels (i.e., RGB) or as luminance and chrominance (i.e., YUV or YCbCr). In the context of the following description a display device may be a conventional CRT (cathode ray tube), LCD (liquid crystal display), LED (light emitting diode), plasma display, projected display (e.g., heads up display), or the like. At operation 115, second image data for a second display device is received, where the second display device has fewer scan lines than the first display device. In other words, the height of the second image data is less than the height of the first image data.

At operation 120, a scan line of the second image data is duplicated. The scan line that is duplicated may correspond to any one of the scan lines of the second image data. At operation 130, the display multiplier output stream is generated. The display multiplier output stream includes a first scan line of the first image data, the scan line of the second image data, a second scan line of the first image data, and the duplicated scan line of the second image data. In one embodiment, the first image data and the second image data are interleaved at a scan line granularity. While the scan lines of the first image data are referred to as the "first" scan line and the "second" scan line, the scan lines may be any one of the scan lines of the first image data. The first scan line is not necessarily the scan line at either the top or the bottom (depending on the direction in which the scan lines are referenced) of the first image data, and so forth.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
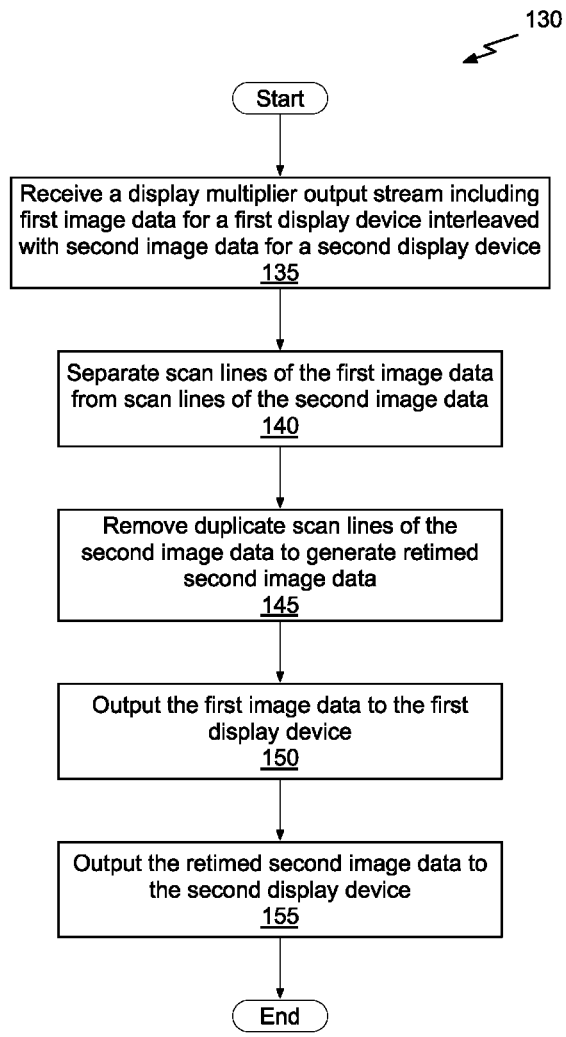
FIG. 1B illustrates a flowchart of a method for processing the display multiplier output stream generated as shown in FIG. 1A, in accordance with one embodiment.

FIG. 1B illustrates a flowchart of a method 130 for processing the display multiplier output stream generated as shown in FIG. 1A, in accordance with one embodiment. At operation 135, a display multiplier output stream is received. The display multiplier output stream may include first image data for a first display device interleaved with second image data for a second display device, wherein the second image data includes at least one duplicate scan line. At operation 140, scan lines of the first image data are separated from scan lines of the second image data to produce separated first image data and separated second image data. At operation 145, the at least one duplicate scan line of the separated second image data is removed to generate retimed second image data. At operation 150, the separated first image data is output to the first display device. At operation 155, the retimed second image data is output to the second display device.

The operations shown in FIG. 1B may be repeated for multiple frames to provide the frames of the separated first image data to the first display device and frames of the retimed second image data to the second display device. The technique used to identify duplicated scan lines for removal should use the same scheme as used to identify scan lines to duplicate, so that duplicated scan lines are correctly identified. It is possible for two or more scan lines of the second image data to contain the same data and seem to be duplicated, so comparison of scan lines is not a robust technique for identifying duplicated scan lines.

Figure 2A:
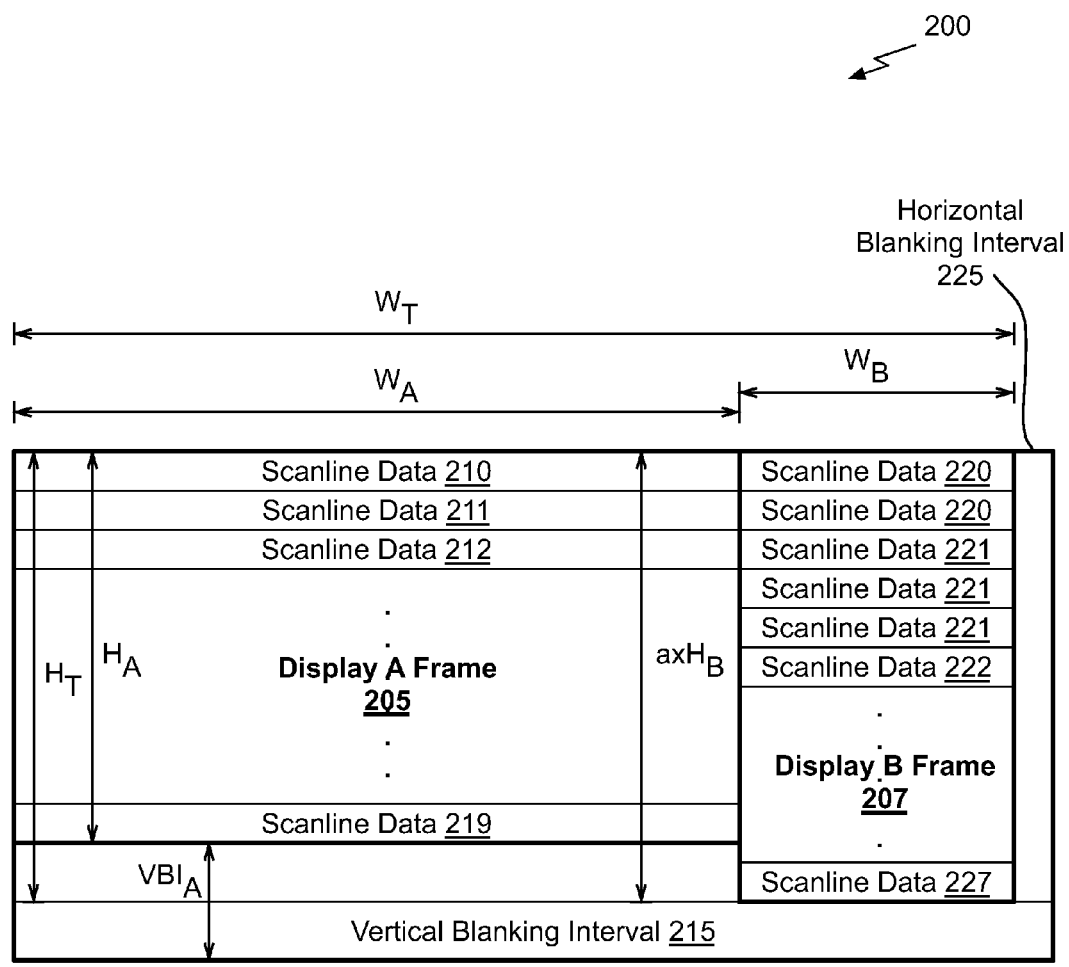
FIG. 2A illustrates a diagram of a frame including image data for a first display and image data for a second display, according to one embodiment.

FIG. 2A illustrates a diagram of a frame 200 including image data for a first display and image data for a second display, according to one embodiment. The frame 200 includes a vertical blanking interval 215 and a horizontal blanking interval 225. The frame 200 may be encoded in a display multiplier output stream and then processed to provide a display A frame 205 to the first display device and a display B frame 207 to the second display device. In this manner, a single frame for output by a graphics processor to a display device via a single display connection may encode separate image data for display by one or more different display devices.

Thus, a graphics processor configured to support two display devices via two display connections may output two display multiplier output streams that each encode image data for two or more different display devices. The two or more different display devices generally are lower resolutions than the frame 200. For example, one or more of the different display devices may be 720×480 at 60 frames-per-second (fps) compared with 2560×1600 at 60 fps for the frame 200. Therefore, display splitting may be a good low cost alternative compared with increasing the number of pins to support connections for each additional display device. A device or processing unit that is external from a graphics processor that generates the display multiplier output stream may be configured to process the display multiplier output stream to split the stream for multiple display devices.

As shown in FIG. 2A, shows the display A frame 205 having an active video resolution of $W_A \times H_A$ (W stands for Width and H for Height) and the display B frame 207 having an active video resolution of $W_B \times H_B$. The combined display resolution of the frame 200 is $W_T >= W_A + W_B$ and $H_T = \max(H_A, H_B)$. The scan line ratio value, a, equals $H_T/H_B$, where $H_T$ is the height of the frame 200 less the vertical blanking interval 215. Although the display A frame 205 is shown as taller (i.e., $H_A > H_B$ and display frame A 205 has more original scan lines) than the display B frame 207 which has original and duplicated scan lines, in other embodiments, the display A frame 205 may be shorter (i.e., having fewer original scan lines) than the display B frame 207. Also, in other embodiments, the display A frame 205 may not be directly adjacent to the display B frame 207 within the frame 200.

The graphics processor is configured to duplicate scan lines of image data for a second display device having a lower height that displays the display B frame 207. Duplicating one or more original scan lines for the display B frame 207 slows that rate at which each new original scan line is output in the display multiplier output stream. Before the display B frame 207 is output to the second display device, the duplicated frames are removed to generate retimed image data that including only the original scan lines in the display B frame 207. Each original scan line of the retimed image data is received by the second display device at a lower rate that corresponds to the slower output pixel clock of the shorter display device. The output pixel clock is slower because the number of pixels in each frame for the second display device is less than the number of pixels in each frame 200.

The second image data included in the display B frame 207 is stored in a pixel buffer and drained from the pixel buffer at the output pixel clock rate corresponding to the second display device. Duplicating the scan lines enables the size of the pixel buffer to be minimized because each scan line of the second image data for the second display device is available to be drained from the pixel buffer for display within one scan line of when the scan line of image data will be displayed. To better understand the importance of duplicating the scan lines, consider outputting the scan line data 220, 221, and 222 without duplication at the input pixel clock rate corresponding to the frame 200 and the input pixel clock rate is faster the output pixel clock rate. While the scan line data 220 is output to the second display device, the scan line data 221 is written to the pixel buffer, overwriting the scan line data 220. Then, the scan line data 221 is output to the second display device while the scan line data 222 is overwrites the scan line data 221 that is stored in the pixel buffer. At some point the scan line data being written overwrites scan line data that has not yet been output to the second display device. Instead of increasing the capacity of the pixel buffer to prevent scan line data from being prematurely overwritten, the rate at which the scan line data is written to the pixel buffer is reduced by discarding the duplicated scan lines before the pixel buffer is written.

The pixel buffer that stores the first image data may be sized to store less than a scan line of the display A frame 205 to align the pixel output for the second display, where the scan line includes $W_A$ pixels. Because the second display device has fewer original scan lines compared with the first display device, the pixel buffer that stores the second image data may be sized to store two scan lines of the display B frame 207, where the scan lines include $W_B$ pixels.

As shown in FIG. 2A, scanline data 210 is output for a first scan line of the display A frame 205, and then the scanline data 220 is output for the first scan line of the display B frame 207 to generate the display multiplier output stream. The scanline data 220 is duplicated for the second scan line of the display B frame 207. The scanline data 211 is output for a second scan line of the display A frame 205, and then the duplicated scanline data 220 is output for the second scan line of the display B frame 207 to generate the display multiplier output stream. The scanline data 212 is output for a third scan line of the display A frame 205, and then the scanline data 221 is output for the third scan line of the display B frame 207 to generate the display multiplier output stream. The scanline data 221 is duplicated for the fourth and fifth scan lines of the display B frame 207 and the scanline data 222 is output for the sixth scan line of the display B frame 207. The scanline data 219 is output for the last scan line of the display A frame 205 and the scanline data 227 is output for the last scan line of the display B frame 207 to generate the display multiplier output stream. In sum, the scanline data 210, 211, 212, through 219 are included in the display multiplier output stream and are interleaved at a scan line granularity with corresponding scanline data 220, 221, 222, through 227 with duplicated scanline data for one or more scan lines of the second display device. For example, in one embodiment, the display multiplier output stream includes image data in the following order: scanline data 210, scanline data 220, scanline data 211, scanline data 220, scanline data 212, scanline data 221, etc.

Figure 2B:
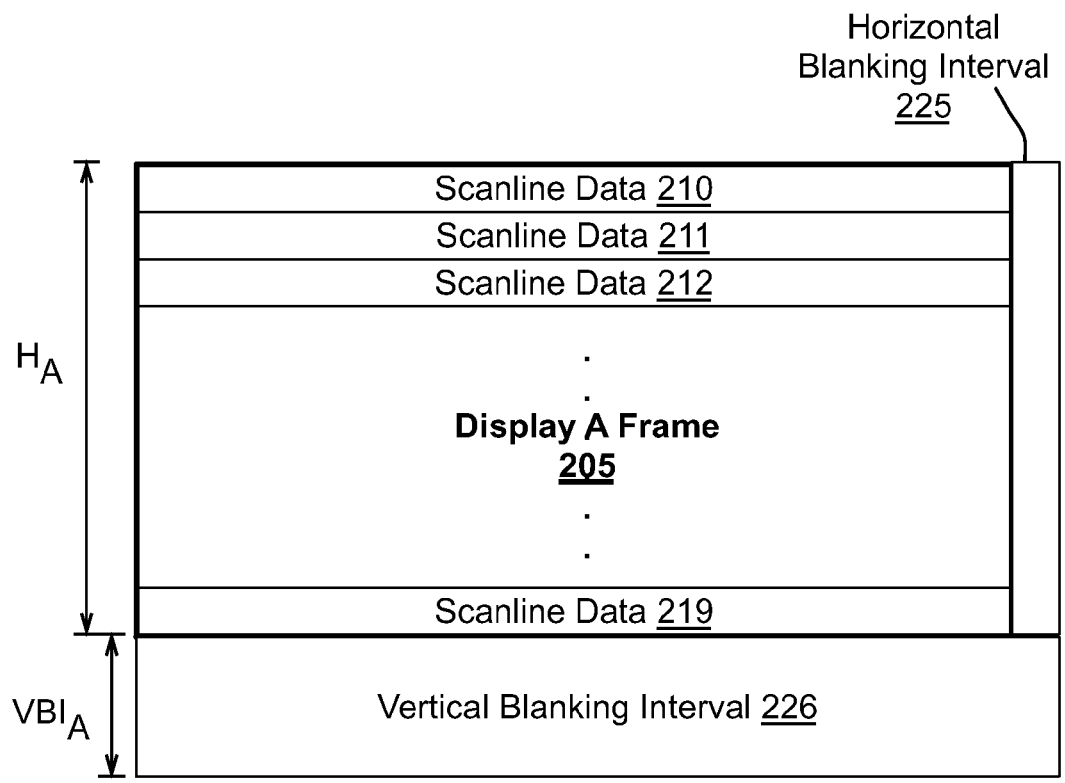
FIG. 2B illustrates a diagram of the image data for the first display, according to one embodiment.

FIG. 2B illustrates a diagram of the image data within the display A frame 205 for the first display device, according to one embodiment. The first image data for each scan line of the first display device is drained from the pixel buffer at a pixel clock corresponding to the first display device to produce the display A frame 205 on the first display device. The display A frame 205 is displayed using a vertical blanking interval 226 that equals $VBI_A$ and the horizontal blanking interval 225. The number of scan lines that are output to the first display device equals $H_A$.

Figure 2C:
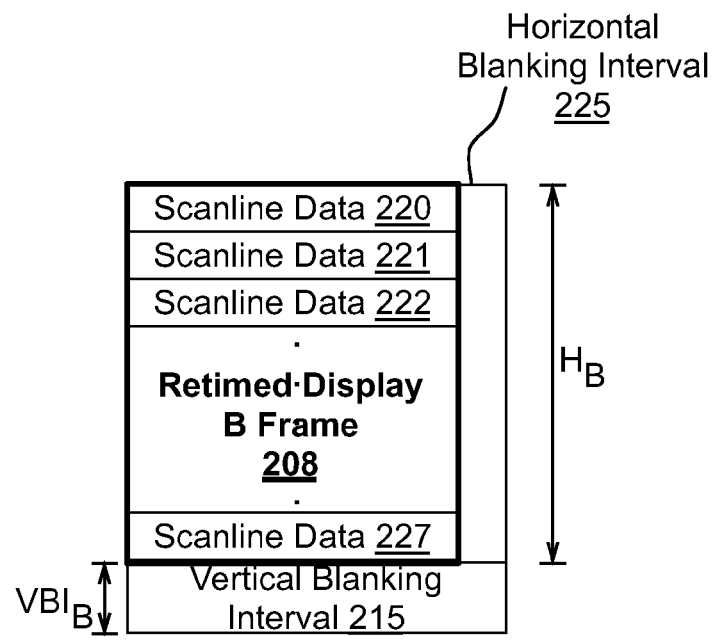
FIG. 2C illustrates a diagram of the image data for the second display, according to one embodiment.

FIG. 2C illustrates a diagram of the image data within a retimed display B frame 208 for the second display, according to one embodiment. When the display multiplier output stream is processed by a display splitter unit, the duplicated scan lines shown in the display B frame 207 for the second display device may be discarded and not stored in the pixel buffer to generate the retimed display B frame 208. The number of scan lines that are output to the second display device equals $H_B$. The retimed display B frame 208 that is the retimed second image data for each scan line of the second device is drained from the pixel buffer at a pixel clock corresponding to the second display device to produce the retimed display B frame 208 on the second display device. The retimed display B frame 208 is displayed using the vertical blanking interval 215 that equals $VBI_B$ and the horizontal blanking interval 225.

Figure 2D:
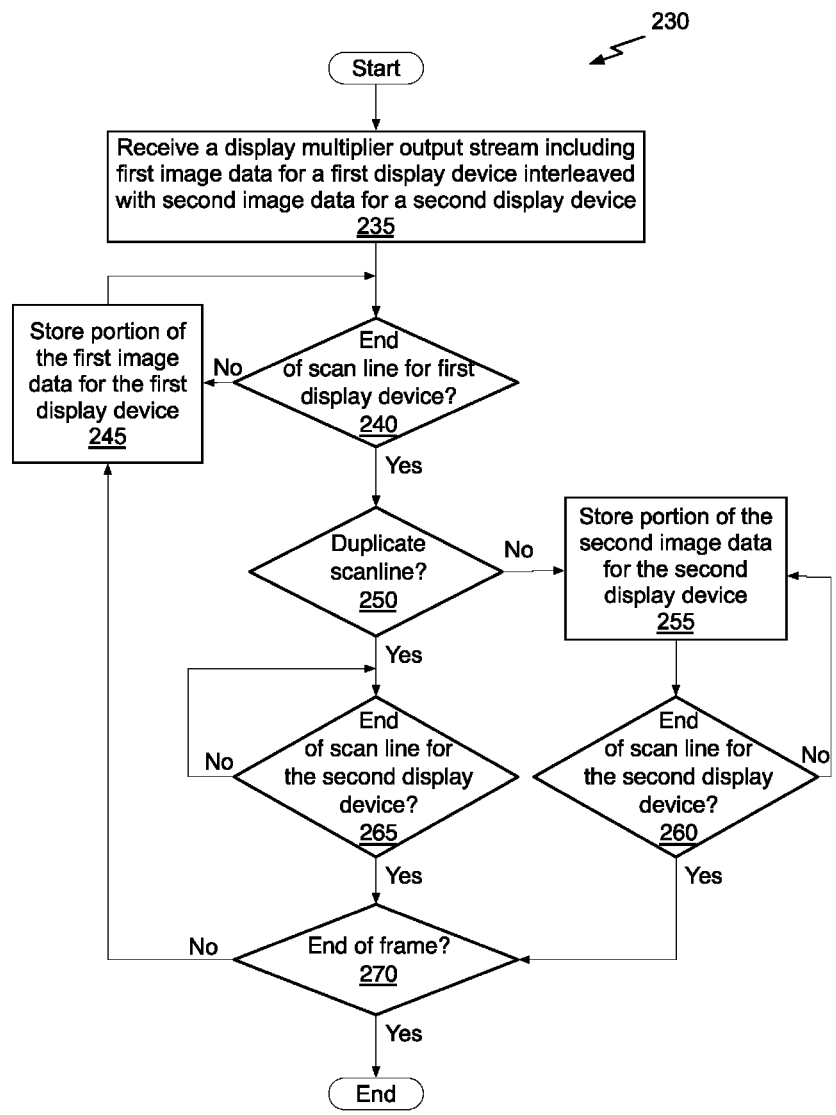
FIG. 2D illustrates another flowchart of a method for processing the display multiplier output stream generated as shown in FIG. 1A, in accordance with one embodiment.

FIG. 2D illustrates a flowchart of another method 230 for processing the display multiplier output stream generated as shown in FIG. 1A, in accordance with one embodiment. At operation 235, a display multiplier output stream is received. At operation 240, if the end of a scan line for the first display device is not reached, then at operation 245 a portion of the first image data corresponding to a scan line is stored for the first display device. The portion may include a single pixel or all of the pixels in a scan line, so it is not necessary to wait for the end of the scan line before storing the portion of the first image data. The end of the scan line may determined based on $W_A$ that may be included in the display multiplier output stream or may be received as a configuration setting. Otherwise, if at operation 240, the end of a scan line for the first display device is reached, then at operation 250, the method determines if the second image data corresponds to a duplicated scan line of the second image data. The first image data may correspond to the display A frame 205 and the second image data may correspond to the display B frame 207.

If the second image data does correspond to a duplicated scan line of the first image data, then at operation 265, the method determines if the end of a scan line for the second display device is reached. In one embodiment, portions of the second image data corresponding to duplicated scan lines are discarded and are not stored to generate retimed second image data. Operation 265 is repeated until the end of the scan line for the second display device is reached.

If, at operation 250, the second image data does not correspond to a duplicated scan line of the first image data, then at operation 255, a portion of the second image data corresponding to a scan line is stored for the second display device to generate the retimed second image data, such as the retimed display B frame 208. At operation 260, if the end of a scan line for the second display device is not reached, then operation 255 is repeated. Operation 260 is repeated until the end of the scan line for the second display device is reached. It is not necessary to wait for the end of the scan line before storing the portion of the second image data. The end of the scan line may determined based on $W_B$ that may be included in the display multiplier output stream or may be received as a configuration setting.

At operation 270, if the end of a frame of the display multiplier output stream is reached, then the method terminates. Otherwise, at operation 245, a portion of the first image data corresponding to a new scan line is stored for the first display device. The operations shown in FIG. 2D may be repeated for multiple frames to provide the frames of the first image data to the first display device and frames of the retimed second image data to the second display device. The portions of first image data and the retimed second image data that are stored in the pixel buffers for display A and display B, respectively, are output for display by the first display device and the second display device as a separate process that may operate asynchronously and in parallel with the storing.

Figure 3:
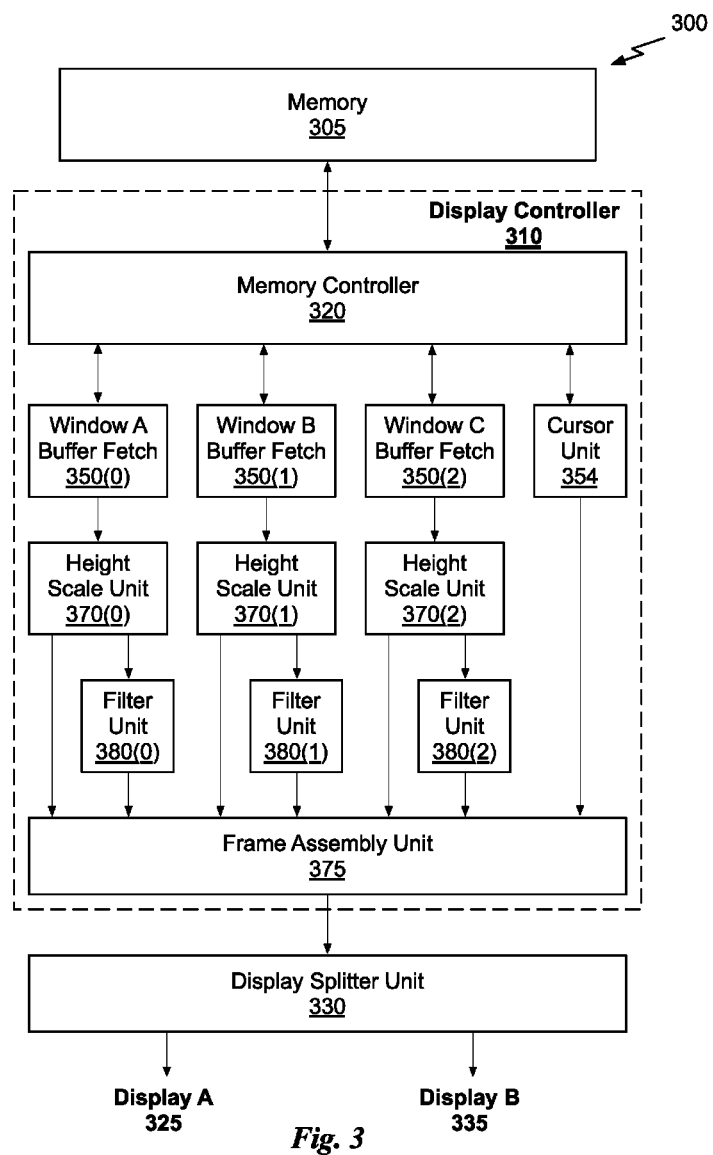
FIG. 3 illustrates a diagram of a display controller coupled to a display splitter unit, according to one embodiment.

FIG. 3 illustrates a diagram of a display controller 310 coupled to a display splitter unit 330, according to one embodiment. Graphics processors, such as the NVIDIA® Tegra® 4 and Tegra® 5 each include two of the display controllers 310 to provide separate connections to two display devices. As shown in FIG. 3, the display controller 310 is configured to combine three separate hardware windows (e.g., windows A, B, and C) with individual memory clients for output to an external display device. In one embodiment, the maximum resolution of the windows, when not limited by the memory bandwidth (e.g., 2560×1600 at 60 fps), can reach 4096 pixels horizontally and 2160 scan lines vertically. The same resolution applies to the output connection coupled to the display device that has a limit of 2560×1600 @ 60 fps on a display signal interface (DSI) (4× lanes) and 1920×1080 @ 60 fps or 4096×2160 @ 30 fps on a high-definition multimedia interface (HDMI). Note that the maximum resolution may be limited by the respective pixel clock.

As previously explained, the display controller 310 may be configured to generate a display multiplier output stream that is split by a receiving device or unit to generate separate images for display on a display A 325 and a display B 335. The combined width of the separate images should not exceed the maximum resolution of the windows and the maximum height of the images should not exceed the maximum number of scan lines of the windows. The window A buffer fetch 350(0) is configured to read image data for window A from a memory 305 via a memory controller 320. Similarly, the window B buffer fetch 350(1) and the window C buffer fetch 350(2) are configured to read image data for window B and window C, respectively, from the memory 305 via the memory controller 320. A cursor unit 354 is configured to read cursor image data from the memory 305 via the memory controller 320.

Each of the height scale units 370(0), 370(1), and 370(2) may be configured to perform vertical scaling operations that duplicate one or more scan lines of image data for each respective window. Typically, the filter units 380(0), 380(1), and 380(2) are configured to filter the scan lines when one or more scan lines are duplicated to improve the image quality. In one embodiment, a height scale unit 370 and filter unit 380 function as a 2 tap, 16 phase programmable vertical filter. The vertical filter may have a 16 bit fractional (4.12 bits for position.fractional portions) accumulator digital differential analyzer (DDA). The 16 bit value is the scan line ratio multiplier, shown as the scan line ratio value a in FIG. 2A ($a=H_T/H_B$, where $H_T$ is the height of the frame 200 less the vertical blanking interval 215). The integer portion selects source scan line(s) of the image data for the window, and the fractional portion controls blending between the two source scan lines, when filtering is enabled. When filtering is not enabled, the integer portion selects one scan line of the image data for the window and the fractional portion is ignored. As shown in FIG. 3, the filter units 380 may be bypassed and a frame assembly unit 375 may select the scaled image data output by one or more of the height scale units 370 instead of selecting a corresponding filtered image data output by one or more of the filter units 380 to generate an output stream.

When the display controller 310 is configured to generate a display multiplier output stream, the filtering should be disabled so that scan lines of the image data for the window may be duplicated, but blending will not be performed to modify the image data for each of the original or duplicated scan lines. The height scale units 370 are configured to duplicate one or more scan lines of image data for a particular window so that each scan line is within one scan line of the timing for the corresponding display device. In other words, spatial (vertical) line duplication is used to provide temporal proximity for the display device and reduce the amount of memory needed to store the image data in the display splitter unit 330, as further described in conjunction with FIGS. 4A and 4B. The width of the target display device should be equal to the width of the window to be displayed in order to preserve original pixel values (i.e. so there is no loss of image quality).

The frame assembly unit 375 is typically configured to generate an output stream for display by a single display device, where one of the windows A, B, or C corresponds to a "desktop" image, and the remaining windows are overlayed on the desktop image along with the cursor. When the frame assembly unit 375 is configured to generate a display multiplier output stream two or more of the windows A, B, or C may correspond to different display devices, so that the image data for the windows are not necessarily overlaid, but are instead positioned to produce frames of combined image data, such as the frame 200 shown in FIG. 2A. The separate image data for each of the display devices may then be split by a display splitter unit 330 for display on each of the separate display devices, a display A 325 and a display B 335. In other embodiments, the number of window buffer fetch units 350, height scale units 370, and filter units 380 is increased to support additional display devices. In another embodiment, the number of window buffer fetch units 350, height scale units 370, and filter units 380 is decreased to two to support two display devices. As previously explained, a processor may include more than one display controller 310 that can each be configured to generate a display multiplier output stream.

Figure 4A:
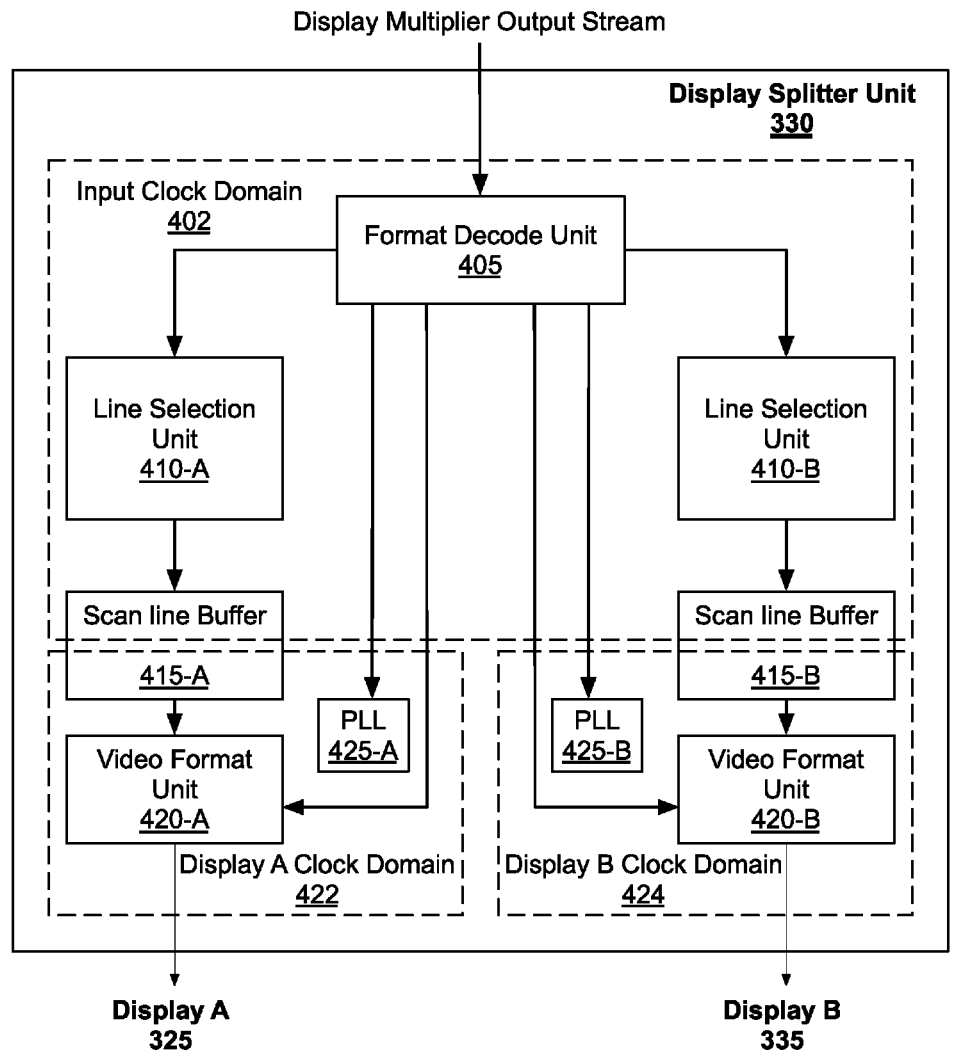
FIG. 4A illustrates the display splitter unit of FIG. 3, according to one embodiment.

FIG. 4A illustrates the display splitter unit 330 of FIG. 3, according to one embodiment. The display splitter unit 330 is a simplified block diagram that illustrates the processing units used to perform the display splitting operations and the display splitter unit 330 may be included within a device or may be a discrete device. In some embodiments, additional processing units and/or circuitry may be included in the display splitter unit 330. The display splitter unit 330 includes circuitry in three different clock domains, an input clock domain 402 associated with the display controller 310, a display A clock domain 422 associated with the display A 325, and a display B clock domain 424 associated with the display B 335.

A format decode unit 405 receives the display multiplier output stream that includes image data for two different display devices and splits the display multiplier output stream into scan lines of first image data for the display A 325 and scan lines of second image data for the display B 335. The first image data may correspond to the display A frame 205 shown in FIG. 2B and the second image data may correspond to the display B frame 207 shown in FIG. 2C.

A line selection unit 410-A receives the scan lines of the first image data and determines which scan lines to pass through to a scan line buffer 415-A. When none of the scan lines are duplicate scan lines, all of the scan lines are passed through to the scan line buffer 415-A. Otherwise, the duplicate scan lines are discarded by the line selection unit 410-A so that the duplicate scan lines do not reach the scan line buffer 415-A. Similarly, a line selection unit 410-B receives the scan lines of the second image data and determines which scan lines to pass through to a scan line buffer 415-B. When none of the scan lines are duplicate scan lines, all of the scan lines are passed through to the scan line buffer 415-B. Otherwise, the duplicate scan lines are discarded by the line selection unit 410-B so that the duplicate scan lines do not reach the scan line buffer 415-B. The line selection units 410 generate retimed image data when one or more duplicate scan lines are removed.

In one embodiment, the line selection units 410 may also be configured to discard pixels of a scan line based on the width of the respective display device. The line selection units 410 may be configured to implement the same DDA algorithm as the height scale unit 370 and filter unit 380. Specifically, the DDA accumulator and the fixed integer scan line ratio multiplier (4 bits+12 bits fractional) may be implemented, so that the duplicated scan lines may be correctly identified by the line selection units 410.

The scan line buffers 415 may be implemented as a pixel first-in-first-out buffer (FIFO) having an input clock (e.g., HDMI input pixel clock) that may operate at a higher speed compared with an output clock that corresponds to a pixel clock of a display device. Each of the scan line buffers 415 may be sized to store at least one scan line for a display device (e.g., 24 bit/pixel). A phase-locked loop (PLL) 425-A generates a clock signal for the display A clock domain 422 and a PLL 425-B generates a clock signal for the display B clock domain 424. The PLLs 425 and video format units 420 receive control input signals from the format decode unit 405. Specifically, the video format units 420 receive a VSYNC signal and the PLLs 425 receive the input pixel clock.

The video format units 420 each reads pixels from the respective scan line buffer 415 and output them according to the output format needed for each display device. The active video of each display device should be properly aligned by the video format units 420 to ensure that there is no starvation or overflow of the scan line buffers 415. In one embodiment, a VSYNC to VSYNC out delta value is provided (in number of lines) by each video format unit 420 to properly align the first active line of each display device. The actual VBI from the input stream should be greater in time than the maximum VBI of each of the display devices. For example, as shown in FIG. 2A, the duration in time of $VBI_T$ is greater than the duration in time of either $VBI_A$ or $VBI_B$. In one embodiment, the display device having fewer active scan lines (i.e., the shortest height) may be coupled to the video format unit 420-B and the line selection unit 410-A may be removed.

Figure 4B:
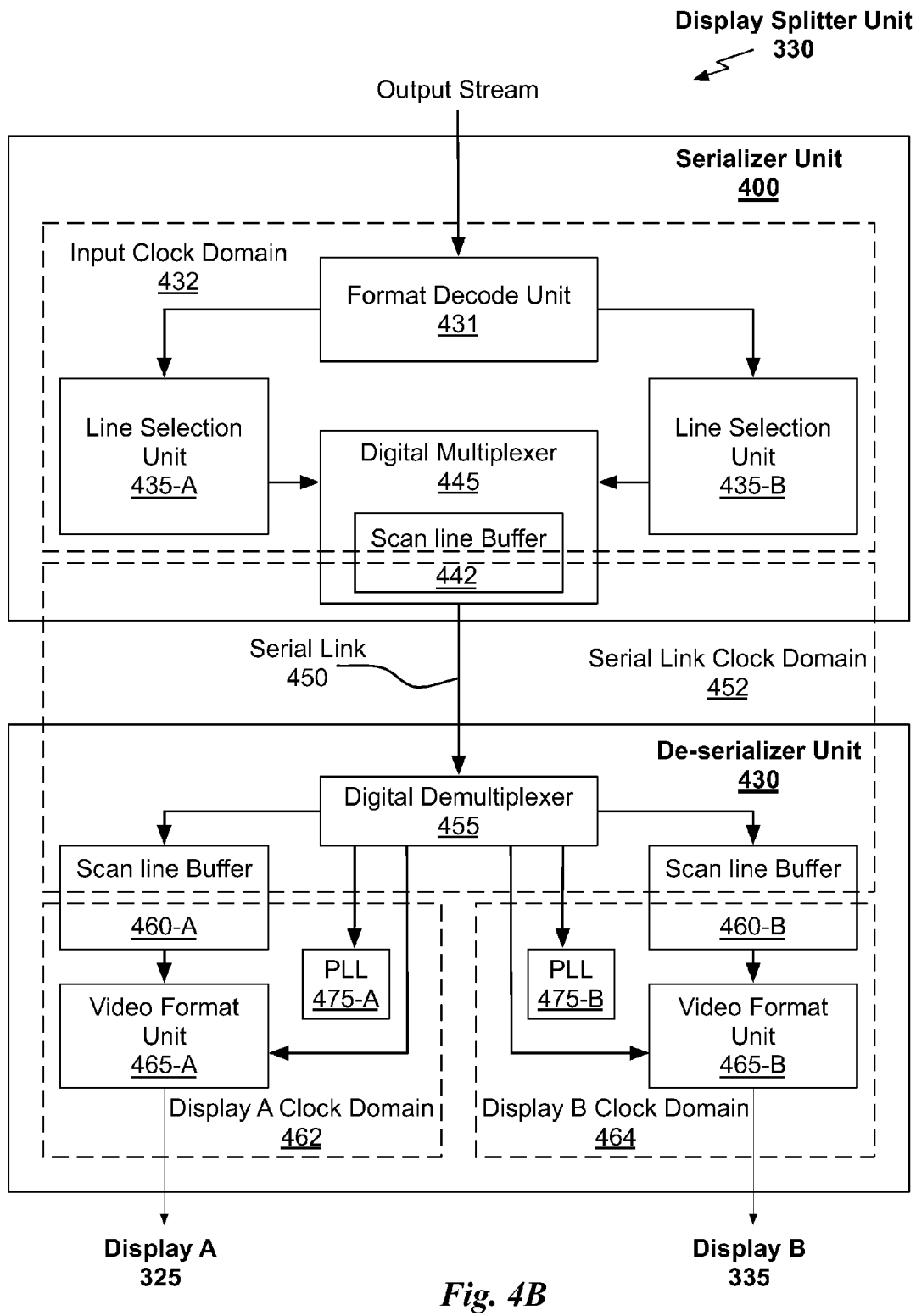
FIG. 4B illustrates another display splitter unit of FIG. 3, according to one embodiment.

FIG. 4B illustrates another display splitter unit 330 of FIG. 3, according to one embodiment. The display splitter unit 330 shown in FIG. 4B includes a serializer unit 400 that is coupled to a de-serializer unit 430 by a serial link 450. The serial link 450 may be implemented as automotive pixel link (APIX), DSI, CSI-2, FPD-Link, or the like. The serializer unit 400 and the de-serializer unit 430 may be implemented within separate discrete devices that are located a short distance apart or several feet apart. The serializer unit 400 and de-serializer unit 430 are simplified block diagrams that illustrate the processing units used to perform the display splitting operations. In some embodiments, additional processing units and/or circuitry may be included in the serializer unit 400 and/or de-serializer unit 430.

The format decode unit 431, and line selection units 435 perform substantially the same operations as the previously described format decode unit 405 and line selection units 410. A digital multiplexer 445 is configured to combine the image data for the display A 325 and the display B 335 after any duplicate scan lines are removed and transmit the image data for the display A 325 and the display B 335 over the serial link 450 on different virtual channels. The combined image data is stored in a scan line buffer 442 before being transmitted on the serial ink 450. The scan line buffer 442 may be implemented as a pixel FIFO having an input clock (e.g., HDMI input pixel clock) that may operate at a higher speed compared with an output clock that corresponds to the serial link 450. The input clock domain 432 corresponds to the input clock and a serial link clock domain 452 corresponds to the serial link 450.

The de-serializer unit 430 receives the combined image data that is transmitted over the serial ink 450. A digital demultiplexer 455 is configured to output the image data received over a first virtual channel to a scan line buffer 460-A and output the image data received over a second virtual channel to a scan line buffer 460-B. The scan line buffers 460 may be implemented as pixel FIFOs having an input clock that may operate at a different speed compared with an output clock that corresponds to the respective display A 325 or the display B 335. The serial link clock domain 452 corresponds to the serial link 450, a display A clock domain 462 corresponds to the display A 325, and a display B clock domain 464 corresponds to the display B 335. Video format units 465 and PLLs 475 perform substantially the same operations as previously described video format units 420 and PLLs 425, respectively.

In an embodiment in which the display B 335 includes a frame buffer, the output clock may be the same as the input clock (i.e., serial link clock domain 452 and display B clock domain 464 may be a single clock domain) and the resulting vertical blanking interval and horizontal blanking interval for the display B 335 are much larger than when the output clock is different than the serial link clock. Using the same pixel clock eliminates the need for the PLL 475-B in the de-serializer unit 430. In one embodiment, the line selection unit for the display device having the greatest number of active scan lines (i.e., the tallest height) may be removed. In other words, when the display B 335 has fewer active scan lines than display A 325, the line selection unit 435-A can be omitted from the serializer unit 400, reducing the implementation cost of the serializer unit 400.

Figure 5:
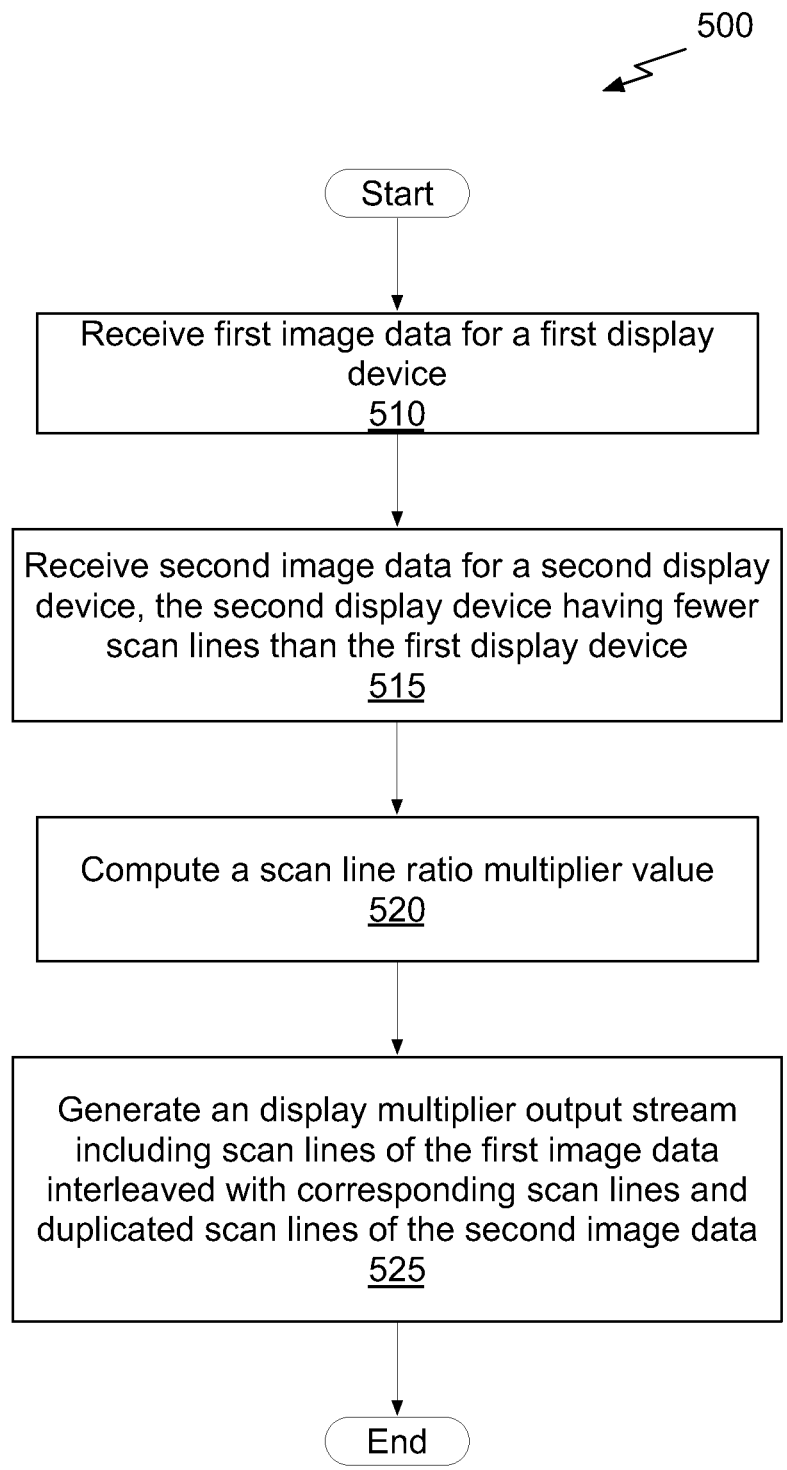
FIG. 5 illustrates another flowchart of a method for generating a display multiplier output stream, in accordance with one embodiment.

FIG. 5 illustrates another flowchart of a method 500 for generating a display multiplier output stream, in accordance with one embodiment. At operation 510, first image data for a first display device is received by a display controller 310. At operation 515, second image data for a second display device is received by the display controller 310, where the second display device has fewer scan lines than the first display device.

At operation 520, a scan line ratio multiplier value is computed by the display controller 310. The scan line ratio multiplier value is used to duplicate one or more scan lines of the second image data. Filtering is disabled for the scaling operation that duplicates the one or more scan lines. At operation 530, the display multiplier output stream is generated. The display multiplier output stream includes scan lines of the first image data that are interleaved with corresponding scan lines and the duplicated scan lines of the second image data.

Figure 6A:
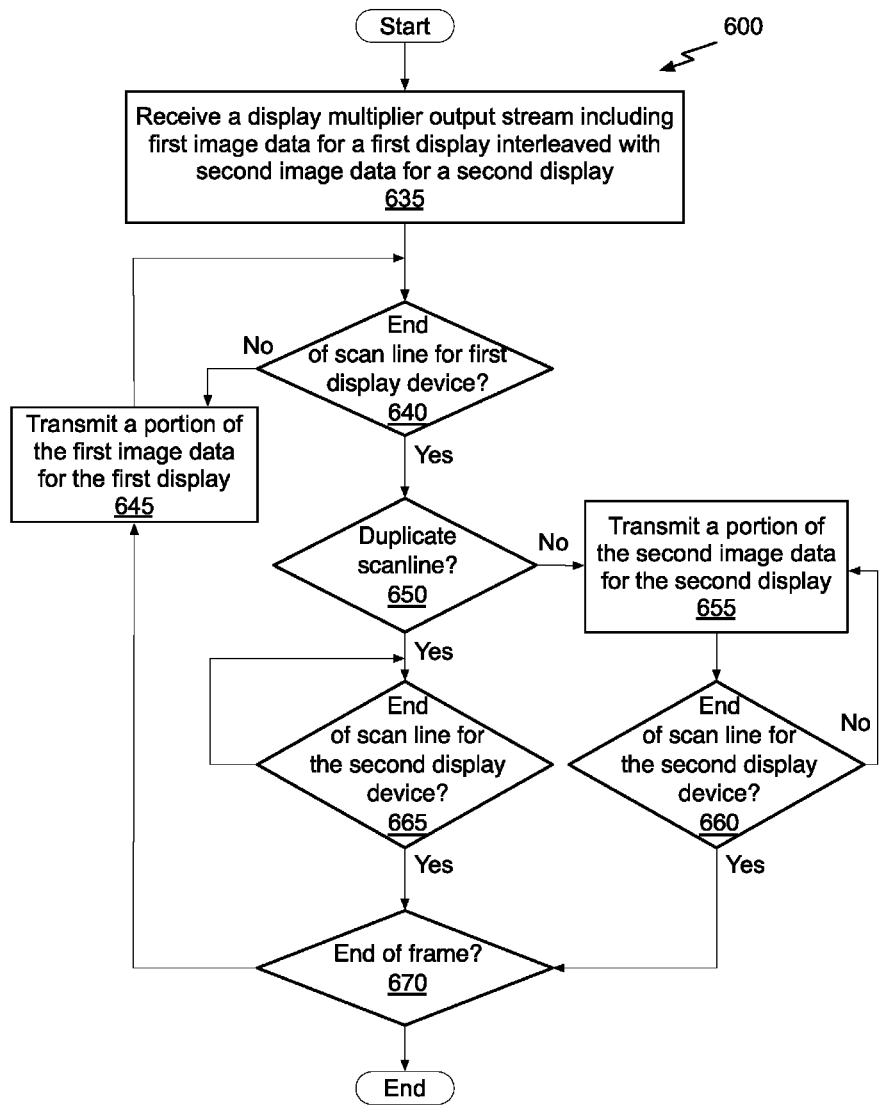
FIG. 6A illustrates a flowchart of a method for processing the display multiplier output stream generated as shown in FIG. 5, in accordance with one embodiment.

FIG. 6A illustrates a flowchart of a method 600 for processing the display multiplier output stream generated as shown in FIG. 5, in accordance with one embodiment. The display multiplier output stream may be processed by a serializer unit 400 of a display splitter unit 330 as shown in FIG. 4B. At operation 635, the display multiplier output stream is received by the serializer unit 400. At operation 640, if the end of a scan line for the first display device is not reached, then at operation 645, a portion (e.g., at least one pixel) of the first image data corresponding to a scan line for the first display device is transmitted over the serial link 450, so it is not necessary to wait for the end of the scan line before transmitting the portion of the first image data. Otherwise, if at operation 640, the end of a scan line for the first display device is reached, then at operation 650, the serializer unit 400 determines if the second image data corresponds to a duplicated scan line of the second image data. The end of the scan line may determined based on $W_A$ that may be included in the display multiplier output stream or may be received as a configuration setting.

If the second image data does correspond to a duplicated scan line of the second image data, then at operation 665, the serializer unit 400 determines if the end of a scan line for the second display device is reached. Operation 665 is repeated until the end of the scan line for the second display device is reached. The duplicated scan line is discarded and is neither stored nor transmitted by the serializer unit 400.

If, at operation 650, the second image data does not correspond to a duplicated scan line of the second image data, then, at operation 655, a portion of the second image data corresponding to a scan line for the second display device is transmitted over the serial link 450 to generate retimed second image data, so it is not necessary to wait for the end of the scan line before transmitting the portion of the second image data. At operation 660, if the end of a scan line for the second display device is not reached, then operation 655 is repeated. Operation 660 is repeated until the end of the scan line for the second display device is reached. The end of the scan line may determined based on $W_B$ that may be included in the display multiplier output stream or may be received as a configuration setting.

At operation 670, if the end of a frame of the display multiplier output stream is reached, then serializer unit 400 terminates processing. Otherwise, at operation 645, a portion of the first image data corresponding to a new scan line for the first display device is transmitted over the serial link 450. The operations shown in FIG. 6A may be repeated by the serializer unit 400 for multiple frames to provide the frames of the first image data to the first display device and frames of the retimed second image data to the second display device.

Figure 6B:
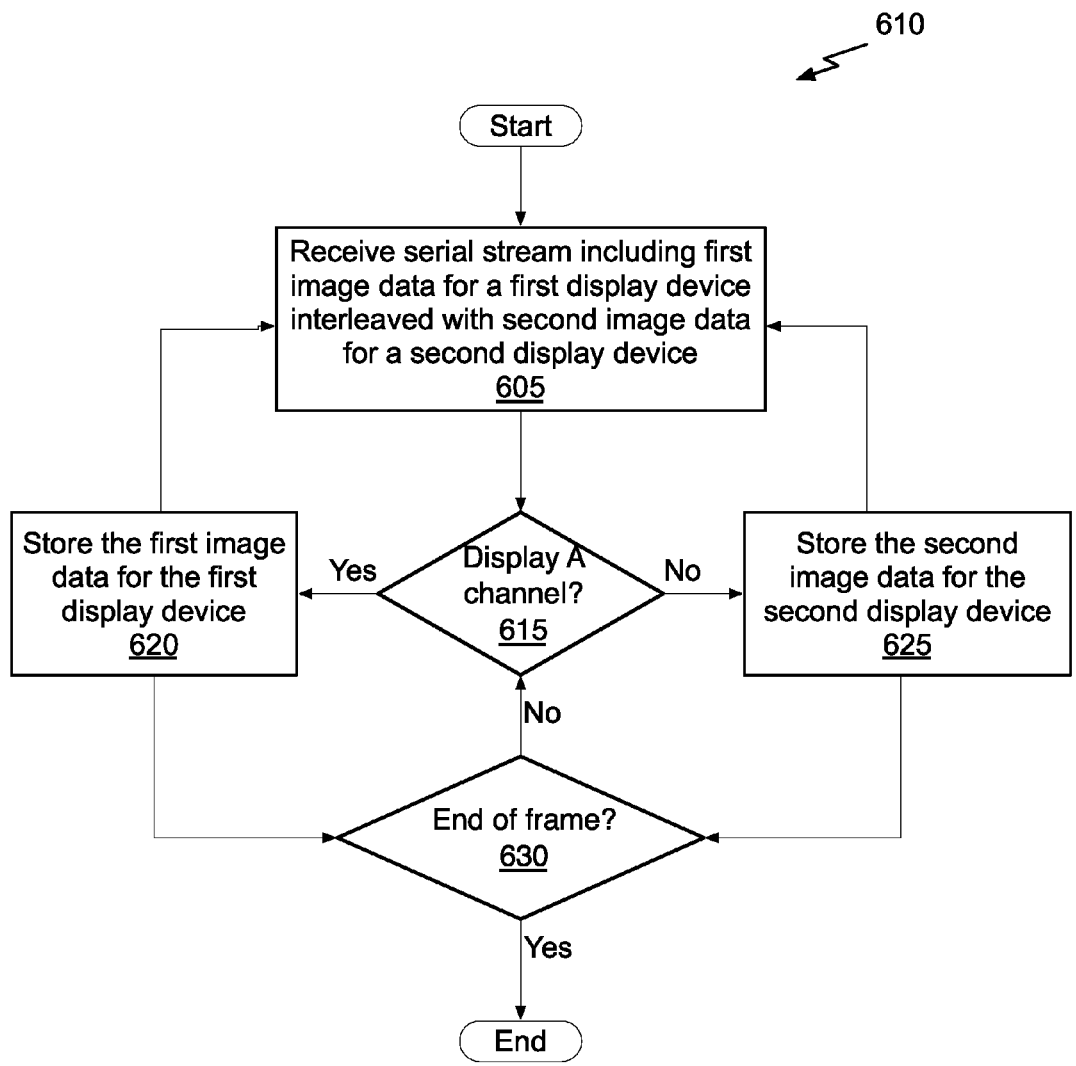
FIG. 6B illustrates a flowchart of a method for processing a serial stream generated as shown in FIG. 6A, in accordance with one embodiment.

FIG. 6B illustrates a flowchart of a method 610 for processing a serial stream generated as shown in FIG. 6A, in accordance with one embodiment. The serial stream may be transmitted over the serial link 450 to the de-serializer unit 430. At operation 605, the serial stream is received by the de-serializer unit 430. The serial stream may include two of more virtual channels over which first image data for a first display is interleaved with retimed second image data for a second display device.

At operation 615, the de-serializer unit 430 determines if the image data received via the serial link 450 is for the display A channel, and, if so, at operation 620, a portion of the first image data corresponding to a scan line is stored for the first display device (i.e., display A 325). Otherwise, at operation 625, de-serializer unit 430 stores a portion of the retimed second image data for the second display device (i.e., display B 335). At operation 630, if the end of a frame of the display multiplier output stream is reached, then the de-serializer unit 430 terminates processing. Otherwise, the de-serializer unit 430 returns to operation 615. The operations shown in FIG. 6B may be repeated by the de-serializer unit 430 for multiple frames to provide the frames of the first image data to the first display device and frames of the retimed second image data to the second display device.

The portions of first image data and the retimed second image data that are stored may be output for display by the first display device and the second display device, respectively, as a separate process that may operate asynchronously and in parallel with the storing.

Figure 7:
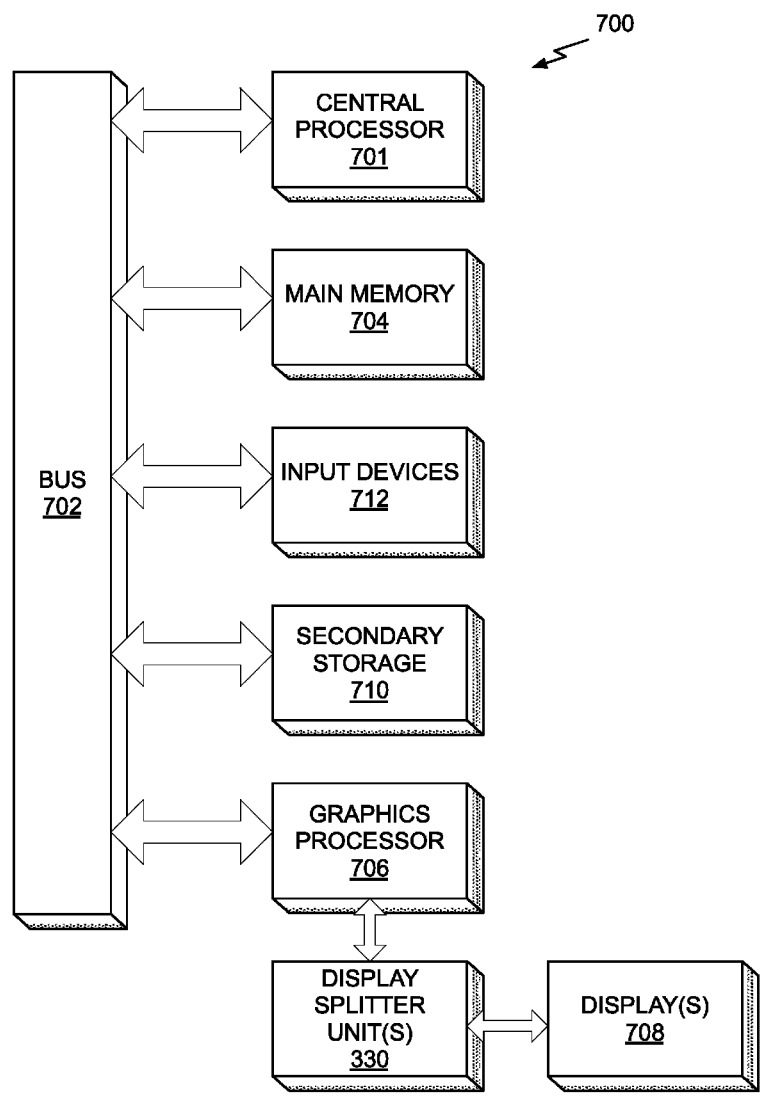
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, one or more display splitter units 330, and one or more display devices 708. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU). The graphics processor 706 may also include one or more display controllers 310 that are each coupled to a display splitter unit 330.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving first image data for a first display device;
    receiving second image data for a second display device, wherein the second display device has fewer scan lines than the first display device;
    computing a scan line ratio multiplier value as a height in scan lines of a frame including the first image data and the second image data divided by a height in scan lines of the second display device;
    duplicating a scan line of the second image data a number of times based on the scan line ratio multiplier value; and generating a display multiplier output stream that includes a first scan line of the first image data, the scan line of the second image data, a second scan line of the first image data, and the duplicated scan line of the second image data.

2. The method of claim 1, wherein the first image data and the second image data are interleaved at a scan line granularity.

3. The method of claim 1, further comprising disabling filtering of the second image data.

4. The method of claim 1, wherein the first image data and the second image data are combined within a frame having a height that is equal to or greater than a number of scan lines of the first display device and a width that is equal to or greater than a sum of a width of the first display device and a width of the second display device.

5. A method, comprising:
receiving first image data for a first display device;
receiving second image data for a second display device, wherein the second display device has fewer scan lines than the first display device;
duplicating a scan line of the second image data; and
generating, by a first device, a display multiplier output stream that includes a first scan line of the first image data, the scan line of the second image data, a second scan line of the first image data, and the duplicated scan line of the second image data, wherein a second device is configured to:
receive the display multiplier output stream;
separate scan lines of the first image data from scan lines of the second image data;
remove the duplicate scan line of the separated second image data to generate retimed second image data;
output the separated first image data to the first display device; and
output the retimed second image data to the second display device.

6. The method of claim 5, the second device further configured to, prior to outputting the separated first image data, store a portion of the separated first image data in a scan line buffer configured to store one scan line of pixels for the first display device.

7. The method of claim 6, wherein the portion of the separated first image data is written to the scan line buffer using a first clock that corresponds to the display multiplier output stream, and further comprising reading the portion of the separated first image data from the scan line buffer using a second clock that corresponds to the first display device.

8. The method of claim 5, the second device further configured to, prior to outputting the retimed second image data, store a portion of the retimed second image data in a scan line buffer configured to store one scan line of pixels for the second display device.

9. The method of claim 8, wherein the portion of the retimed second image data is written to the scan line buffer using a first clock that corresponds to the display multiplier output stream, and further comprising reading the portion of the retimed second image data from the scan line buffer using a second clock that corresponds to the second display device.

10. The method of claim 9, wherein a number of the at least one duplicate scan line of the separated second image data that is removed is based on the scan line ratio multiplier value.

11. The method of claim 5, the second device further configured to compute a scan line ratio multiplier value as a height in scan lines of a frame including the first image data and the second image data divided by a height in scan lines of the second display device.

12. A system, comprising:
a memory configured to store first image data for a first display device and second image data for a second display device; and
a display controller that is coupled to the memory and configured to:
receive the first image data for the first display device;
receive the second image data for the second display device, wherein the second display device has fewer scan lines than the first display device;
compute a scan line ratio multiplier value as a height in scan lines of a frame including the first image data and the second image data divided by a height in scan lines of the second display device;
duplicate a scan line of the second image data a number of times based on the scan line ratio multiplier value; and
generate a display multiplier output stream that includes a first scan line of the first image data, the scan line of the second image data, a second scan line of the first image data, and the duplicated scan line of the second image data.

13. The system of claim 12, wherein the first image data and the second image data are interleaved at a scan line granularity.

14. The system of claim 12, wherein the display controller is further configured to disable filtering of the second image data.

15. The system of claim 12, wherein the first image data and the second image data are combined within a frame having a height that is equal to or greater than a number of scan lines of the first display device and a width that is equal to or greater than a sum of a width of the first display device and a width of the second display device.

16. A system, comprising:
a display controller configured to generate a display multiplier output stream including first image data for a first display device interleaved with second image data for a second display device, wherein the second image data includes at least one duplicate scan line; and
a display splitter unit that is coupled to the display controller and configured to:
receive the display multiplier output stream;
separate scan lines of the first image data from scan lines of the second image data;
remove the at least one duplicate scan line of the second image data to generate retimed second image data;
output the separated first image data to the first display device; and
output the retimed second image data to the second display device.

* * * * *